(12) United States Patent
Moyer et al.

(10) Patent No.: US 7,689,815 B2
(45) Date of Patent: Mar. 30, 2010

(54) DEBUG INSTRUCTION FOR USE IN A DATA PROCESSING SYSTEM

(75) Inventors: William C. Moyer, Dripping Springs, TX (US); Michael D. Snyder, Cedar Park, TX (US); Gary L. Whisenhunt, Leander, TX (US)

(73) Assignee: Freescale Semiconductor, Inc, Austin, TX (US)

( * ) Notice: Subject to any disclaimer, the term of this patent is extended or adjusted under 35 U.S.C. 154(b) by 340 days.

(21) Appl. No.: 11/871,847

(22) Filed: Oct. 12, 2007

(65) Prior Publication Data

US 2009/0100254 A1    Apr. 16, 2009

(51) Int. Cl.
*G06F 11/36* (2006.01)
(52) U.S. Cl. ................ 712/227; 714/35; 714/38
(58) Field of Classification Search ........... 712/227; 714/35, 38
See application file for complete search history.

(56) References Cited

U.S. PATENT DOCUMENTS

| 5,491,793 | A   |    | 2/1996  | Somasundaram et al.   |         |
|-----------|-----|----|---------|-----------------------|---------|
| 6,289,300 | B1  |    | 9/2001  | Brannick et al.       |         |
| 6,587,967 | B1  | *  | 7/2003  | Bates et al.          | 714/35  |
| 7,240,185 | B2  | *  | 7/2007  | Cofler et al.         | 712/227 |
| 7,444,547 | B2  | *  | 10/2008 | Abou-Emara et al.     | 714/38  |
| 2001/0032305 | A1 |   | 10/2001 | Barry                 |         |
| 2003/0074650 | A1 | * | 4/2003  | Akgul et al.          | 717/129 |
| 2005/0240820 | A1 |   | 10/2005 | Vannerson et al.      |         |
| 2007/0050682 | A1 |   | 3/2007  | Takuma et al.         |         |

OTHER PUBLICATIONS

PCT/US2008/075581 International Search Report and Written Opinion, Mar. 13, 2009.
EJTAG Specificaton Revision 3.10; Jul. 5, 2005; 153 pages; MIPS Technologies; Mountain View, CA.
User's Manual Version 1.1; "Microcontrollers on Chip-Debug-Support"; Aug. 2001; 64 pp; Infineon Technologies.
"e200z6 PowerPC Core Reference Manual"; Jun. 2004; Cover Page, Information Page, Table of Contents, and pp. 10-10 thru 10-25; Freescale Semiconductor, Inc.

* cited by examiner

*Primary Examiner*—William M Treat
(74) *Attorney, Agent, or Firm*—Joanna G. Chiu; Susan C. Hill

(57) ABSTRACT

A method includes providing a debug instruction and providing a debug control register field, where if the debug control register field has a first value, the debug instruction executes a debug operation and where if the debug control register field has a second value, the debug instruction is to be executed as a no-operation (NOP) instruction. A data processing system includes instruction fetch circuitry for receiving a debug instruction, a debug control register field, and debug execution control circuitry for controlling execution of the debug instruction in a first manner if the debug control register field has a first value and in a second manner if the debug control register field has a second value, where in the first manner a debug operation is performed and in the second manner no debug operation is performed.

14 Claims, 6 Drawing Sheets dnh    dui, duis

```
0         5 6      10 11              20 21              30 31
| 0 1 0 0 1 1 | dui |    duis    | 0 0 1 1 0 0 0 1 1 0 | 0 |
```

*FIG. 5* dnh2    dui, duis, group

```
0         5 6      10 11          17 18  20 21              30 31
| 0 1 0 0 1 1 | dui |    duis    | group | 0 0 1 1 0 0 0 1 1 0 | 1 |
```

*FIG. 6*

DBCR4

```
0           15 16   17 18   19 20   21 22   23 24   25 26   27 28   29 30   31
|     -       | GRP7C | GRP6C | GRP5C | GRP4C | GRP3C | GRP2C | GRP1C | GRP0C |
```

*FIG. 7*

| BITS | NAME | DESCRIPTION |
|---|---|---|
| 0:15 | – | RESERVED |
| 16:17 | GRP7C | GROUP7 CONTROL<br><br>00 GROUP7 dnh2 INSTRUCTIONS GENERATE A DEBUG INSTRUCTION EXCEPTION<br>01 GROUP7 dnh2 INSTRUCTIONS ARE TREATED AS NOPS<br>1X RESERVED |
| 18:19 | GRP6C | GROUP6 CONTROL<br><br>00 GROUP6 dnh2 INSTRUCTIONS GENERATE A DEBUG INSTRUCTION EXCEPTION<br>01 GROUP6 dnh2 INSTRUCTIONS ARE TREATED AS NOPS<br>1X RESERVED |
| ⋮ | | |
| 30:31 | GRP0C | GROUP0 dnh2 CONTROL<br><br>00 GROUP0 dnh2 INSTRUCTIONS AND ALL dnh INSTRUCTIONS GENERATE A DEBUG INSTRUCTION EXCEPTION<br>01 GROUP6 dnh2 INSTRUCTIONS AND ALL dnh INSTRUCTIONS ARE TREATED AS NOPS<br>1X RESERVED |

*FIG. 8*

| 0 | 1 | 2 | 15 16 | 17 18 | 19 20 | 21 22 | 23 24 | 25 26 | 27 28 | 29 30 | 31 |
|---|---|---|---|---|---|---|---|---|---|---|---|
| EDM | DNH_EN | – | GRP7C | GRP6C | GRP5C | GRP4C | GRP3C | GRP2C | GRP1C | GRP0C | |

*FIG. 9*

| BITS | NAME | DESCRIPTION |
|---|---|---|
| 0 | EDM | EXTERNAL DEBUG MODE<br>0 INDICATES THE PROCESSOR IS NOT IN EXTERNAL DEBUG MODE<br>1 INDICATES THE PROCESSOR IS IN EXTERNAL DEBUG MODE |
| 1 | DNH_EN | DEBUGGER NOTIFY HALT ENABLE<br>0 INDICATES THAT THE dnh AND dnh2 INSTRUCTIONS WILL OPERATE AS INDICATED BY THE DBCR4 GROUP SETTINGS<br>1 INDICATES THAT THE dnh AND dnh2 INSTRUCTIONS WILL OPERATE AS INDICATED BY THE EDBCR0 GROUP SETTINGS |
| 2:15 | – | RESERVED, SHOULD BE CLEARED |
| 16:17 | GRP7C | GROUP7 WATCHPOINT AND HALT CONTROL<br>00 GROUP7 dnh2 INSTRUCTIONS ARE TREATED AS NOPS<br>01 GROUP7 dnh2 INSTRUCTIONS WILL CAUSE THE PROCESSOR TO HALT AND ENTER DEBUG MODE<br>10 GROUP7 dnh2 INSTRUCTIONS WILL CAUSE A WATCHPOINT TO BE SIGNALED<br>11 GROUP7 dnh2 INSTRUCTIONS WILL CAUSE THE PROCESSOR TO HALT AND ENTER DEBUG MODE AND WILL CAUSE A WATCHPOINT TO BE SIGNALED |
| 18:19 | GRP6C | GROUP6 WATCHPOINT AND HALT CONTROL<br>00 GROUP6 dnh2 INSTRUCTIONS ARE TREATED AS NOPS<br>01 GROUP6 dnh2 INSTRUCTIONS WILL CAUSE THE PROCESSOR TO HALT AND ENTER DEBUG MODE<br>10 GROUP6 dnh2 INSTRUCTIONS WILL CAUSE A WATCHPOINT TO BE SIGNALED<br>11 GROUP6 dnh2 INSTRUCTIONS WILL CAUSE THE PROCESSOR TO HALT AND ENTER DEBUG MODE AND WILL CAUSE A WATCHPOINT TO BE SIGNALED |
| ⋮ | | |
| 30:31 | GRP0C | GROUP0 dnh2 WATCHPOINT AND HALT CONTROL<br>00 GROUP0 dnh2 INSTRUCTIONS AND dnh INSTRUCTIONS ARE TREATED AS NOPS<br>01 GROUP0 dnh2 INSTRUCTIONS AND dnh INSTRUCTIONS WILL CAUSE THE PROCESSOR TO HALT AND ENTER DEBUG MODE<br>10 GROUP0 dnh2 INSTRUCTIONS AND dnh INSTRUCTIONS WILL CAUSE A WATCHPOINT TO BE SIGNALED<br>11 GROUP0 dnh2 INSTRUCTIONS AND dnh INSTRUCTIONS WILL CAUSE THE PROCESSOR TO HALT AND ENTER DEBUG MODE AND WILL CAUSE A WATCHPOINT TO BE SIGNALED |

*FIG. 10*

DEBUG INSTRUCTION FOR USE IN A DATA PROCESSING SYSTEM

BACKGROUND

1. Field

This disclosure relates generally to data processing systems, and more specifically, to a debug instruction for use in a data processing system.

2. Related Art

Debug instructions are commonly used during software development to allow debug operations to take place. Once the software has been developed and checked with debug instructions, these debug instructions are removed so as not to cause undesired exceptions in the software application. However, removal of these debug instructions can change the execution characteristics of the system which may result in less predictable execution. This may be especially problematic in real-time applications.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIGS. 5 and 6 is a diagram illustrating exemplary debug instructions capable of execution by the processor of FIG. 2.

FIG. 7 is a diagram of a debug control register associated with the debug registers of FIG. 3, in accordance with one embodiment of the present invention.

FIG. 8 shows, in a tabular form, functionality of a portion of the debug control register of FIG. 7, in accordance with one embodiment of the present invention.

FIG. 9 is a diagram of an external debug control register associated with the external debug registers of FIG. 4, in accordance with one embodiment of the present invention.

FIG. 10 shows, in a tabular form, functionality of a portion of the external debug control register of FIG. 9, in accordance with one embodiment of the present invention.

DETAILED DESCRIPTION

Figure 1:
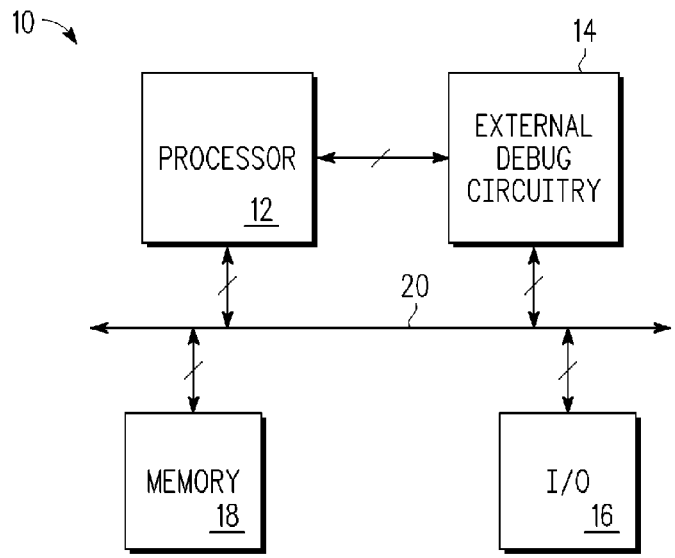
FIG. 1 is a block diagram of a data processing system, in accordance with one embodiment of the present invention.

Current debug instructions provide the capability of conditionally entering a debug halted mode (i.e. a debug mode) or else causing a software debug exception (i.e. a debug interrupt) under software control during the software development process, to allow software or hardware debug operations to take place. However, once software development is complete, those debug instructions which remain embedded in the finalized code will result in undesired exceptions and thus must be removed. However, removal of these debug instructions changes the execution characteristics of the system. That is, the code image itself changes since branch targets, page boundaries, and other instruction relationships may change upon removal of the debug instructions. In order to allow the code image itself to remain unchanged and thus possibly provide for more predictable execution, one embodiment discussed herein provides additional control to allow debug instructions to operate as "no-op" instructions (also referred to as no-operation instructions or NOPs) or to be suppressed from execution. This allows for the debug instructions to remain in place during application execution in which no debugging is to be performed, where any debug instruction can be treated as a NOP, where NOPs may operate as known in the art, or where the execution of the debug instruction may be suppressed, such that no debug operation is performed, even though the instruction has debug-related execution semantics.

Also, in one embodiment, a class of debug instructions allow for grouping of debug instructions into independent groups, where each group has independent control over the action or actions to be taken upon execution, thereby providing additional debug flexibility. These groups may be independently controlled, and the resulting actions may be dynamically modified by either the hardware or software debugger.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

FIG. 1 illustrates a data processing system 10 consistent with an embodiment of the invention. Data processing system 10 may be a system-on-chip. Data processing system 10 may be implemented on a single integrated circuit or on a plurality of integrated circuits. Data processing system 10 includes a processor 12, an external debug circuitry 14, an I/O module 16, and a memory 18, which may be coupled via bus 20. In alternate embodiments, memory 18 may be any type of memory and may be located on the same integrated circuit as processor 12, or on a different integrated circuit than processor 12. Memory 18 may be any type of memory, such as, for example, a read only memory (ROM), a random access memory (RAM), non-volatile memory (e.g. Flash), etc. Also, memory 18 may be a memory or other data storage located within another peripheral or slave or on a different integrated circuit. External debug circuitry 14 may be contained on the same integrated circuit as processor 12, or may be implemented as a separate system independent of the integrated circuit or system-on-chip containing processor 12.

Figure 2:
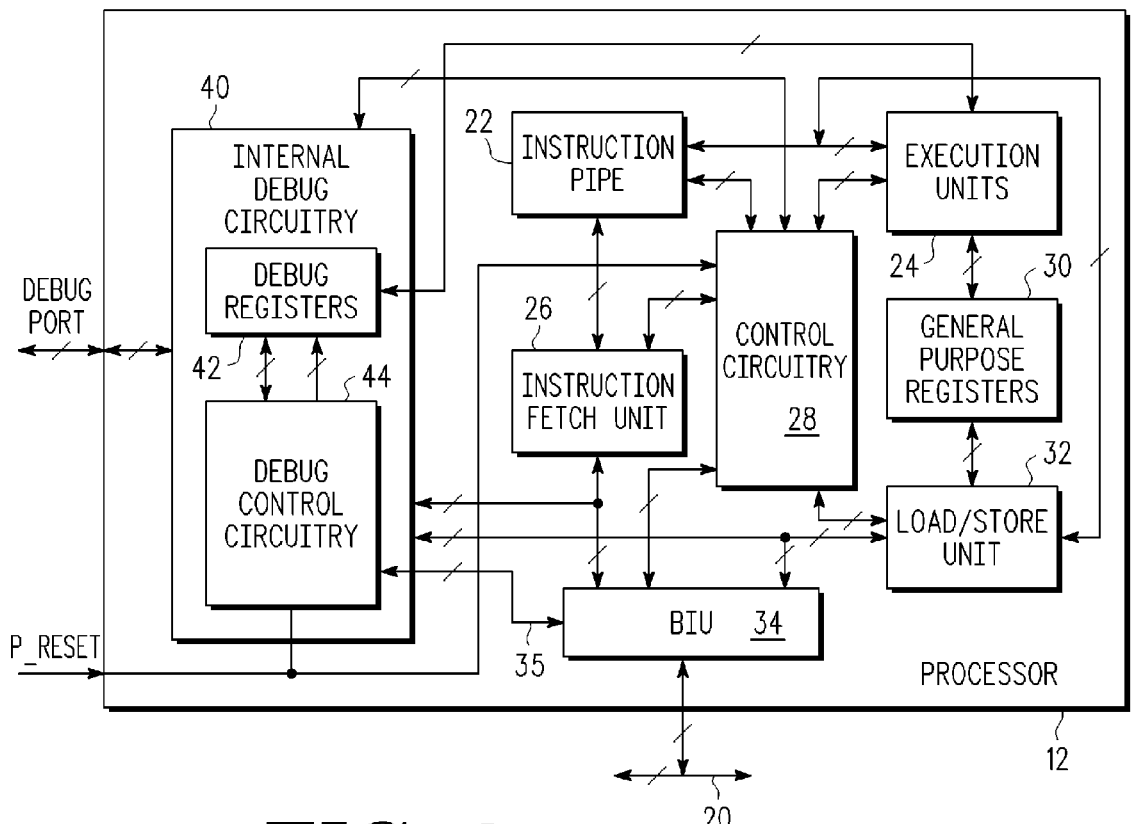
FIG. 2 is a block diagram of a processor associated with the data processing system of FIG. 1, in accordance with one embodiment of the present invention.

FIG. 2 is a block diagram of processor 12 associated with data processing system 10 of FIG. 1. Processor 12 may include an instruction pipe 22, execution units 24, instruction fetch unit 26, control circuitry 28, general purpose registers 30, load/store unit 32, bus interface unit (BIU) 34 and internal debug circuitry 40. Processor 12 may communicate with other components of data processing system 10 via bus 20 coupled to BIU 34. Internal debug circuitry 40 may be coupled to external debugging units, such as an IEEE ISTO-5001 compliant Nexus™ debugging unit via debug port shown in FIG. 2. External debugging units may include all or a portion of external debug circuitry 14 of FIG. 1. Nexus™ is a trademark of Freescale Semiconductor, Inc. located in Austin, Tex. Debug port may be a serial interface, such as JTAG, or may be implemented as a parallel port, a combination of serial and parallel ports, or as an Ethernet port. Internal debug circuitry 40 may include debug registers 42 and debug control circuitry 44. Debug registers 42 may include bits grouped in fields for controlling various debug related events, including instruction breakpoints, data breakpoints, watchpoints, and other messaging associated with debugging. These debugging resources may be shared between processor 12 and external debug circuitry 14.

Figure 3:
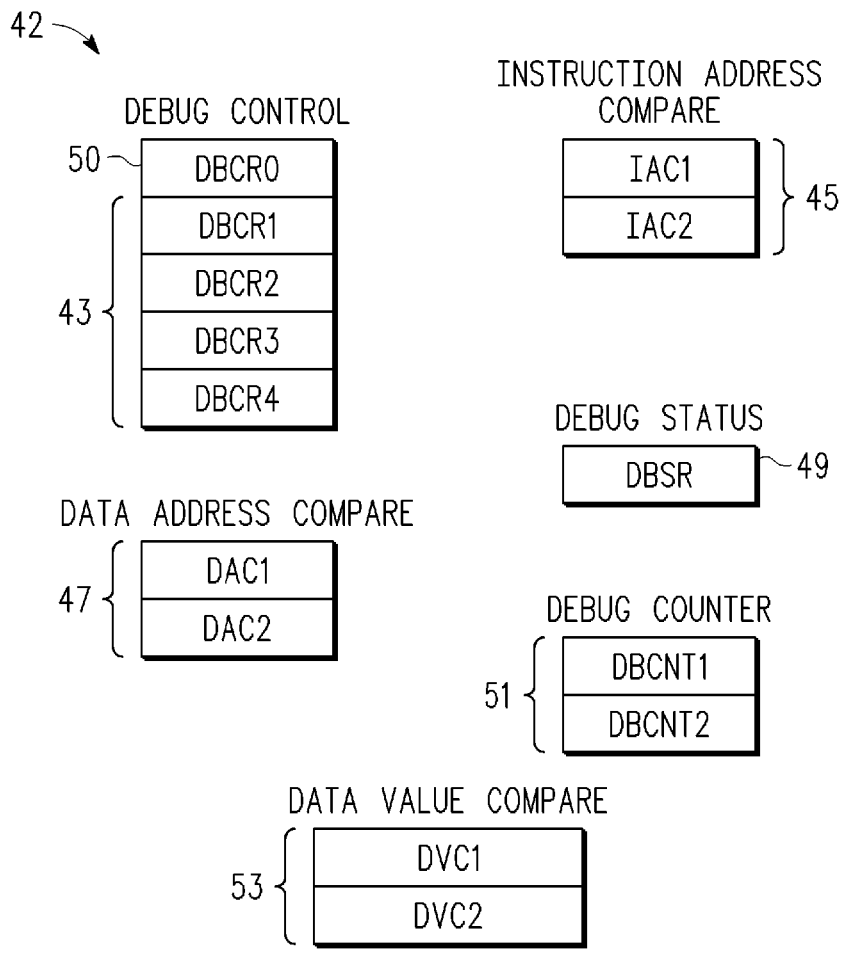
FIG. 3 is a diagram illustrating exemplary debug registers associated with the data processing system of FIG. 1.

Referring now to FIG. 3, registers within debug registers 42 may also be provided for storing one or more address comparison values, address ranges, and data match values for implementing instruction and/or data access breakpoint and watchpoint events, and other debug control criteria. These address and data values, along with various control criteria, are used to determine when processor 12 accesses one or more predetermined instruction addresses or data addresses for the purpose of generating a breakpoint or watchpoint event, which can cause processor 12 to begin exception processing for a debug exception when internal debug mode is active, or cause processor 12 to enter a debug halted mode in which it responds to commands provided by external debug circuitry 14 through the debug port of internal debug unit 40 when external debug mode is active. By way of example, debug registers 42 may include various debug control registers, including debug registers 43 (DBCR0, DBCR1, DBCR2, DBCR3, and DBCR4). These debug control registers may be used to store various types of debug configuration information. Debug registers 42 may further include instruction address compare registers 45 (IAC1 and IAC2). Instruction address compare registers 45 may store instruction addresses for address comparison purposes. Debug registers 42 may further include data address compare registers 47 (DAC1 and DAC2). Data address compare registers 47 may store data access addresses for address comparison purposes. Debug registers 42 may further include debug status register 49, debug counters 51 (DBCNT1 and DBCNT2), and data value compare registers 53 (DVC1 and DVC2). Debug registers 42 may be a part of the user's software programming model. Debug counters 51 may be configured to count-down when one ore more count-enabled events occur. When a count value reaches zero, a debug count event may be signaled, and a debug interrupt may be generated, if enabled. Data value compare registers 53 may store data values for data comparison purposes.

In internal debug mode, these register resources are managed by software, and no external debug circuitry usage is required. Software may configure the registers through data movement using move to and from special purpose register instructions which are software instructions to initialize the individual debug registers for performing software-based debugging activities, in which enabled debug events cause software debug interrupts to occur. A software interrupt handler may then perform various desired activity which is determined by the software programmer of data processing system 10.

Figure 4:
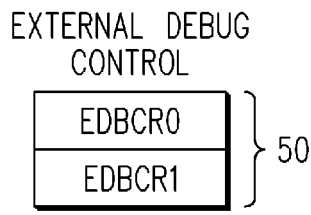
FIG. 4 is a diagram illustrating exemplary external debug registers associated with the data processing system of FIG. 1.

In external debug mode, external debug circuitry 14 may be assigned ownership of the shared debug registers of debug registers 42, and when a configured debug event occurs, processor 12 may enter a halted state and wait for a command to be provided by external debug circuitry 14. Software no longer has control of the shared debug resources when external debug mode is enabled. Also, as illustrated in FIG. 4, debug registers 42 may include various external debug control registers 50, such as EDBCR0 and EDBCR1. Unlike the registers of FIG. 3, the registers of FIG. 4, which may be located within debug registers 42 or elsewhere within processor 12, are not part of the user's software programming model. That is, software executing on processor 12 does not have visibility of external debug control registers 50. External debug circuitry 14 may access the shared debug resources and any dedicated external debug resources (such as external debug control registers 50) directly via the debug port (as shown in FIG. 2). The debug port of FIG. 2 may be, for example, implemented as a JTAG TAP port. In one embodiment, debug registers 42 and external debug control registers 50 may be mapped as JTAG data registers with register selection encodings contained within one or more fields for the various JTAG instructions, which provide for read and write accesses to the registers by the debugger through JTAG IR and DR operations.

Sharing of a set of registers requires fewer processor 12 resources to be implemented, and this may simplify the programming model for the user of data processing system 10. Internal debug circuitry 40 monitors activity within processor 12 and in response to detecting one or more predetermined conditions based on stored debug configuration information present within debug registers 42 or elsewhere within processor 12, may generate one or more data breakpoint events, instruction breakpoint events, instruction execution events such as a branch or trap taken event, an instruction completion event, and the like. In this manner of operation, processor 12 functions as can be appreciated by those skilled in the art.

FIGS. 5 and 6 illustrate two forms of a debug notify halt instruction. FIG. 5 illustrates a debug notify halt (dnh) instruction where execution of the dnh instruction operates as indicated by a predetermined control field of an appropriate debug control register (which may be EDBCR0 if external debug mode has been enabled or DBCR4 if external debug mode has not been enabled, both of which will be discussed below). FIG. 6 illustrates a different type of debug notify halt instruction (a dnh2 instruction) which allows for groupings of different dnh2 instructions. That is, the dnh2 instruction includes a field which indicates a group. This group identifier associates a debug control field (e.g. a group control field) to the dnh2 instruction. For example, in the illustrated embodiment of FIG. 6, the group field of dnh2 is a 3-bit field which allows for indicating one of eight different groups (groups 0-7). Execution of the dnh2 instruction then operates as indicated by a corresponding group control field of an appropriate debug control register (which may be EDBCR0 if external debug mode has been enabled or may be DCBR4 if external debug mode has not been enabled). In one embodiment, as will be described in reference to FIG. 10 below, an external debug mode bit field within external debug control registers 50 is used to indicate whether or not processor 12 is operating in external debug mode, where an external debugger such as external debug circuitry 14 sets or clears this field to cause processor 12 to operate in external debug mode or not, respectively. In one embodiment, when processor 12 is not operating in external debug mode, it is considered to be operating in internal debug mode.

Note that the dnh and dnh2 instructions illustrated in FIGS. 5 and 6 may use any variety of different formats and may include other fields, in addition to the opcode (e.g. bits 0 to 5 of the dnh and dnh2 instructions), subopcode (e.g. bits 21-31 of the dnh and dnh2 instructions), and group identifier (e.g. bits 18-20 of the dnh2 instruction). For example, as illustrated in FIGS. 5 and 6, each of the dnh and dnh2 instructions also include a dui and duis field. For example, if processor 12 is halted in response to a dnh or dnh2 instruction, the dui field may be sent to the external debug circuitry to identify the reason for the halt. Also, the duis field man be used to pass additional information about the halt.

FIG. 7 is a diagram of a debug control register, DBCR4, associated with the data processing system of FIG. 1. DBCR4 may be included as part of debug registers 42, which may be located within internal debug unit 40. DBCR4 may be used to store debug configuration information. Although FIG. 7 illustrates a specific embodiment of the present invention which uses specific fields, alternate embodiments of the present invention may use different fields having different numbers of bits in each field. The specific fields depicted in FIG. 7 are shown only for illustrative purposes. By way of example, DBCR4 may include 32 bits. DBCR4 may include various fields, including 2-bit group fields such as GRP7C, GRP6C, GRP5C, GRP4C, GRP3C, GRP2C, GRP1C, and GRP0C. These fields are merely exemplary and DBCR4 may include fewer or additional fields. In addition, these fields may be arranged differently. DBCR4 may also include reserved bit fields 0 to 15, which may be used in the future. By way of example, DBCR4 may be a readable/writeable register which may be part of the user's software programming model. In alternate embodiments of the present invention, DBCR4 may not be a control register in the user's software programming model, but instead may be implemented outside of the user's software programming model. Any type of storage circuitry may be used to implement DBCR4. Alternatively, one or more other debug control registers (such as within debug registers 42) may include the group fields of DBCR4 rather than DBCR4.

When processor 12 is operating in internal debug mode, each of group fields GRP1C-GRP7C of DBCR4 may be used to configure the functionality of those dnh2 instructions with group identifiers which indicate the corresponding group. For example, operation of a dnh2 instruction which indicates group 3 is controlled by GRP3C when in internal debug mode. Furthermore, when in internal debug mode, GRP0C may be used to configure the functionality of both those dnh2 instructions which indicate group 0 as well as dnh instructions. That is, in one embodiment, the predetermined control field of DBCR4 used to indicate how a dnh instruction is to operate during internal debug mode is GRPC0. In this example, any dnh instruction indicates group 0 by default (since there is no field in the dnh instruction itself to indicate a particular group, unlike the dnh2 instruction). Alternatively, the predetermined control field of DBCR4 that is used to indicate how a dnh instruction is to operate can be any one of GRP0C to GRP7C.

FIG. 8 shows, in a tabular form, functionality of a portion of DBCR4 of FIG. 7. GRP7C is a 2-bit field which is used to indicate how group7 dnh2 instructions (i.e. dnh2 instructions which indicate group 7) should operate, in accordance with one embodiment. For example, a binary value of 00 may indicate that group7 dnh2 instructions generate a debug instruction exception (which may therefore cause debug interrupt processing to be initiated). A debug instruction exception results in a software interrupt, and therefore, a debug instruction exception generated as a result of the dnh2 instruction (or dnh instruction) may also be referred to as a software debug interrupt. A binary value of 01 may indicate that group7 dnh2 instructions are treated as NOPs (where NOPs may operate or be implemented in a variety of ways, as known in the art). In the illustrated embodiment, the binary values of 10 and 11 are reserved for possible future use. In an alternate embodiment, a single bit may be used for GRP7C to indicate whether the group7 dnh2 instructions generate a software interrupt or are treated as NOPs. GRP6C through GRP1C are also two-bit fields whose descriptions are the same as those provided for GRP7C but for the respective group of dnh2 instructions. GRP0C is a 2-bit field which, in one embodiment, is used to indicate how both dnh and group0 dnh2 instructions should operate. For example, a binary value of 00 may indicate that group0 dnh2 instructions as well as all dnh instructions generate a debug instruction exception (i.e. a software interrupt). A binary value of 01 may indicate that group0 dnh2 instructions as well as all dnh instructions are treated as NOPs. In the illustrated embodiment, the binary values of 10 and 11 are reserved for possible future use. In an alternate embodiment, a single bit may be used for GRP0C to indicate whether the dnh instructions and the group0 dnh2 instructions generate a software interrupt or are treated as NOPs. In one embodiment, rather than execute the dnh or dnh2 instructions as NOPs, instruction execution of these instructions may be suppressed, such that they do not appear to execute, even though they may be fetched and partially decoded.

FIG. 9 is a diagram of an external debug control register, EDBCR0, associated with the data processing system of FIG. 1, in accordance with one embodiment. EDBCR0 may be included as part of external debug registers 50, which may or may not be a part of debug control registers 42 within internal debug unit 40, but which are not accessible by software executing on processor 12. EDBCR0 may be used to store debug configuration information for use during external debug mode. Although FIG. 9 illustrates a specific embodiment of the present invention which uses specific fields, alternate embodiments of the present invention may use different fields having different numbers of bits in each field. The specific fields depicted in FIG. 9 are shown only for illustrative purposes. By way of example, EDBCR0 may include 32 bits. EDBCR0 may include various fields, including an EDM bit field, a DNH_EN bit field, and 2-bit group fields such as GRP7C, GRP6C, GRP5C, GRP4C, GRP3C, GRP2C, GRP1C, and GRP0C. These fields are merely exemplary and EDBCR0 may include fewer or additional fields. In addition, these fields may be arranged differently. EDBCR0 may also include reserved bit fields 2 to 15, which may be used in the future. By way of example, EDBCR0 may be a register that is only writeable by external debug circuitry via the debug port, where the external debug circuitry is located external to processor 12 but may be on a same or different integrated circuit as processor 12. By way of example, EDBCR0 is not a control register in the user's software programming model. Any type of storage circuitry located within or external to processor 12 may be used to implement EDBCR0. Alternatively, one or more other external debug control registers (such as within external debug control registers 50) may include one or more of the fields of EDBCR0 rather than EDBCR0.

FIG. 10 shows, in a tabular form, functionality of a portion of EDBCR0 of FIG. 9, in accordance with one embodiment. EDM is a bit field is used to indicate whether external debug mode is enabled or disabled. In one embodiment, when external debug mode is disabled, internal debug mode is considered enabled. (Alternatively, a separate enable field for internal debug mode may be used, such as, for example, within DBCR0.) In one example, when the EDM field is set (e.g., has a binary value of 1), processor 12 operates in external debug mode and when the EDM field is cleared (e.g., has a binary value of 0), processor 12 operates in internal debug mode. When EDM bit 52 is set to 1, for example, control registers, such as DBCR4, are placed under exclusive control of external debug circuitry 14 and data processing system 10 software cannot write information to these control registers. Alternatively, when EDM bit 52 is set to 1, software cannot write to specific portions of debug control registers. DNH_EN is an enable field which indicates whether the group fields of DBCR4 or the group fields of EDBCR0 are to be used to indicate operation of the dnh and dnh2 instructions. That is, even though processor 12 is operating in external debug mode, DNH_EN may be cleared to indicate that the group settings of DBCR4 rather than EDBCR0 should be used to indicate operation of the dnh and dnh2 instructions (where, in one embodiment, the GRP0C settings of DBCR4 would be used for the dnh instructions, and the group settings of DBCR4 corresponding to the group indicated by each dnh2 instruction itself would be used for the dnh2 instructions). However, if DNH_EN is set, the dnh and dnh2 instructions operate as indicated by the appropriate group fields of EDBCR0.

Still referring to FIG. 10, GRP7C is a 2-bit field which is used to indicate how group7 dnh2 instructions (i.e. dnh2 instructions which indicate group 7) should operate. For example, a binary value of 00 may indicate that group7 dnh2 instructions are treated as NOPs (where NOPs may operate or be implemented in a variety of ways, as known in the art). A binary value of 01 may indicate that group7 dnh2 instructions will cause the processor to halt and enter debug mode. For example, upon a processor halt, control is transferred from processor 12 to an external debugger, such as external debug circuit 14, to perform debug operations and access processor 12 via the debug port. Therefore, upon entering debug mode, instruction fetch unit 26 may halt normal instruction fetching. A binary value of 10 may indicate that group7 dnh2 instructions will cause a watchpoint to be signaled. A binary value of 11 may indicate that group7 dnh2 instructions will cause the processor to halt and enter debug mode and will also case a watchpoint to be signaled. Note that in an alternate embodiment, different bit value encodings may be used to represent operation of group7 dnh instructions. GRP6C through GRP1C are also two-bit fields whose descriptions are the same as those provided for GRP7C but for the respective group of dnh2 instructions. GRP0C is a 2-bit field which is used to indicate how both dnh2 and dnh instructions should operate. That is, in one embodiment, GRP0C is the predetermined control field of EDBCR0 that is used to indicate how a dnh instruction is to operate. For example, a binary value of 00 may indicate that group0 dnh2 instructions as well as all dnh instructions are treated as NOPs. A binary value of 01 may indicate that group0 dnh2 instructions as well as all dnh instructions will cause the processor to halt and enter debug mode. A binary value of 10 may indicate that group7 dnh2 instructions as well as dnh instructions will cause a watchpoint to be signaled. A binary value of 11 may indicate that group7 dnh2 instructions as well as dnh instructions will cause the processor to halt and enter debug mode and will also case a watchpoint to be signaled. Alternatively, the predetermined control field of EDBCR0 that is used to indicate how a dnh instruction is to operate can be any one of GRP0C to GRP7C.

Therefore, when in external debug mode and DNH_EN is set, each of group fields GRP0C-GRP7C of EDBCR0 may be used to configure the functionality of those dnh2 instructions which indicate the corresponding group. For example, operation of a dnh2 instruction which indicates group 3 is controlled by GRP3C of EDBCR0 when in external debug mode and DNH_EN is set. (Note that operation of a dnh2 instruction which indicates group 3 is controlled by GRP3C of DBCR4 when in external debug mode and DNH_EN is cleared.) Furthermore, when in external debug mode and DNH_EN is set, GRP0C of EDBCR0 may be used to configure the functionality of both those dnh2 instructions which indicate group 0 as well as dnh instructions. That is, in one embodiment, the predetermined control field of EDBCR0 used to indicate how a dnh instruction is to operate during external debug mode when DNH_EN is set is GRPC0. In this example, any dnh instruction indicates group 0 by default (since there is no field in the dnh instruction itself to indicate a particular group, unlike the dnh2 instruction). When in external debug mode and DNH_EN is cleared, though, GRP0C of DBCR4 may instead be used to configure the functionality of both those dnh2 instructions which indicate group 0 as well as dnh instructions. Therefore, note that the predetermined control field used to indicate how a dnh instruction is to operate during external debug mode may depend on DNH_EN, where the GRP0C settings of DBCR4 or EDBCR0 may be used as the predetermined control field depending on the value of DNH_EN. However, in an alternate embodiment, DNH_EN may not be used or may not be present. In this embodiment, when in external debug mode, only the appropriate group fields of EDBCR0 (and not DBCR4) indicate how dnh and dnh2 instructions are to operate.

Therefore, note that each of the dnh and dnh2 instructions are capable of performing debug operations or of being treated as NOPs, in which no debug operation is performed. In one embodiment, rather than execute the dnh or dnh2 instructions as NOPs, instruction execution of these instructions may be suppressed, such that they do not appear to execute (and thus no debug operation is performed), even though they may be fetched and partially decoded. As used herein, a debug operation includes such things as, for example, causing the processor to halt and enter debug mode, causing a watchpoint to be signaled, generating a software debug interrupt, or the like. In one embodiment, watchpoint signaling allows processor 12 to signal the occurrence of one or more watchpoint conditions external or internal to processor 12, rather than causing a breakpoint or a debug halt condition. In the examples described above, debug operations such as causing the processor to halt and enter debug operation as well as causing a watchpoint to be signaled occur during external debug mode, while generating a software debug interrupt can occur during either external or internal debug mode, based, for example, on DNH_EN. Alternatively, other debug operations may be defined for either internal or external debug mode by the group fields of DBCR4 and EDBCR0. However, depending on the settings of the group field of the appropriate debug control register (such as, for example, DBCR4 or EDBCR0), a dnh or dnh2 instruction can be treated as a NOP (or can be suppressed from execution) rather than perform a debug operation. That is, depending on the settings of the group field of the appropriate debug control register, a dnh or dnh2 instruction can either execute as a dnh or dnh2 instruction (and thus perform a debug operation) or may be executed as a NOP. As discussed above, a NOP can perform as known in the art. However, note that as used herein, a NOP does not perform a debug operation. That is, a NOP does not result in a debug operation being performed. Furthermore, note that the ability to execute a debug instruction as a NOP rather than as a debug instruction (which performs a debug operation) or the ability to group debug instructions can apply to any type of debug instructions and is not limited to just debug notify halt instructions such as dnh and dnh2. In one embodiment, no execution of the instruction may be performed, and instead, depending on the settings of the group field of the appropriate debug control register (such as, for example, DBCR4 or EDBCR0), execution of a dnh or dnh2 instruction can be suppressed, rather than progressing through the execution stages of processor 12.

Figures 12, 13:
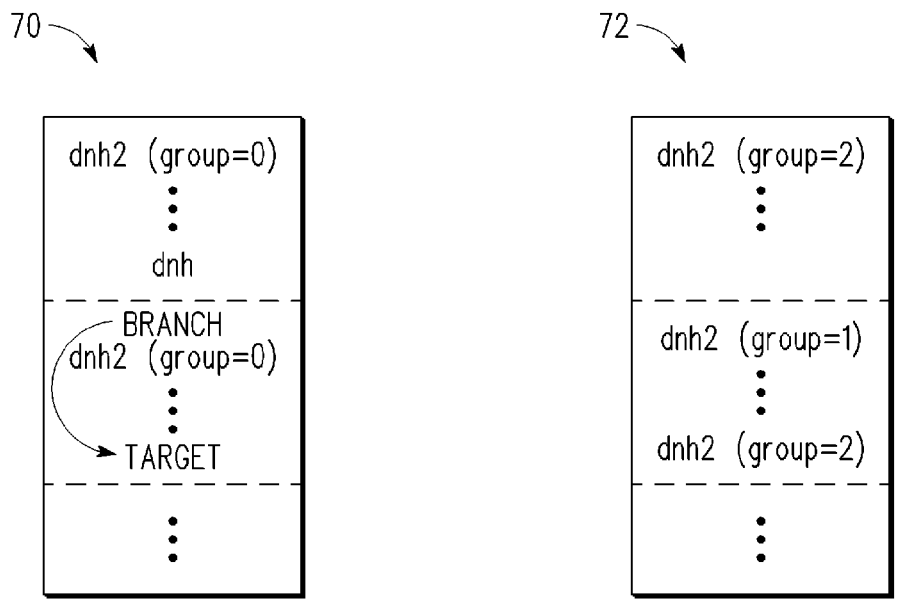
FIGS. 12 and 13 are diagrams of exemplary code sections which use the debug instructions of FIGS. 5 and 6.

In one embodiment, the ability to treat debug instructions such as the dnh and dnh2 instructions as NOPs allows for the ability to suppress debug operations. This may therefore allow for debug instructions to remain in finalized code without causing interrupts or other debug operations to occur. In this manner, the code image can remain unchanged. For example, FIG. 12 illustrates a code segment 70 which includes dnh2 instructions indicating group 0 and a dnh instruction (whose default is group 0). These instructions may have been necessary for debugging code segment 70; however, upon finalizing code segment 70, removal of these instructions may undesirably change the code image of code segment 70, where, for example, the page boundaries (illustrated by the horizontal dotted lines), branches, and branch target instruction locations (such as illustrated by the branch instruction with an arrow pointing at its target location) would change, relative to the remaining instructions. By setting the GRP0C field of DBCR4 to 01, the dnh and dnh2 instructions of code segment 70 would operate as NOPs, thus not causing debug instructions exceptions (not causing an interrupt). Furthermore, it may be desirable to finalize code segment 70 while debugging a new code segment 72, illustrated in FIG. 13. Therefore, note that new code segment 72 includes dnh2 instructions which indicate groups 1 and 2. Note that these dnh2 instructions are not affected by the settings of GRP0C because they do not indicate group 0. In this manner, the dnh2 instructions can be independently controlled and thus operate differently than the dnh2 and dnh instructions of code segment 70. Therefore, the groupings of the dnh2 instructions can be used in a variety of different manners. Furthermore, the "groupings" discussed herein (i.e. the use of the group fields within one or more debug control registers) can be used for any debug instruction and are not limited to just debug notify halt instructions.

Figure 11:
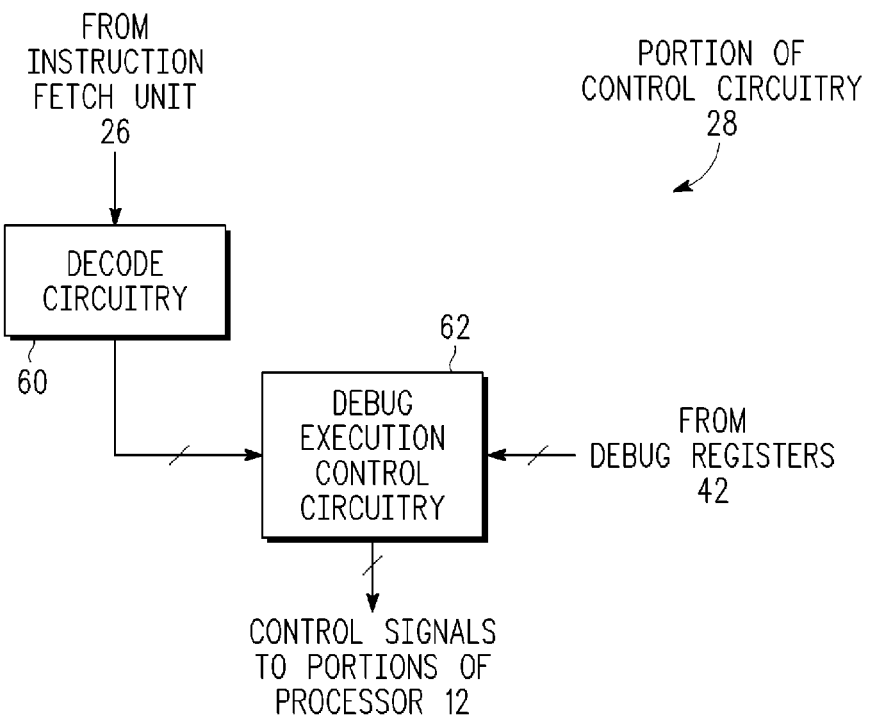
FIG. 11 illustrates a block diagram illustrating a potion of the control circuitry of the processor of FIG. 2, in accordance with one embodiment of the present invention.

FIG. 11 illustrates a portion of control circuitry 28 within processor 12 in accordance with one embodiment of the present invention. Control circuitry 28 includes decode circuitry 60 and debug execution control circuitry 62. Decode circuitry 60 is coupled to receive information from instruction fetch unit 26 and coupled to provide information to debug execution control circuitry 62. Debug execution control circuitry 62 also receives information from debug register 42 and provides control signals to portions of processor 12, as needed.

In operation, information regarding a currently executing instruction or an instruction to be executed is provided from instruction fetch unit 26 to decode circuitry 60. This information may include, for example, indication of a dnh2 instruction that is to be executed. The decode circuitry 60 then decodes this instruction to provide the appropriate information to debug execution control circuitry 62. For example, decode circuitry 60 may route the group field of a dnh2 instruction to debug execution control circuitry which uses the value of this group field to access the corresponding group control field of the appropriate debug control register of debug registers 42 (e.g., DBCR4 or EDBCR0, depending on the values of EDM and DNH_EN). Based on the results, debug execution control circuitry 62 can provide the appropriate control signals to portions of processor 12, as needed, to implement the appropriate function for the dnh2 instruction indicated by the information from debug registers 42. For example, if a debug operation is indicated, then appropriate control signals, as known in the art, are provided accordingly, or if a NOP is indicated, then appropriate control signals, as known in the art, are provided accordingly. Furthermore, if execution of the instruction is to be suppressed, then appropriate control signals, as known in the art, are provided accordingly. Therefore, note that debug execution control circuitry 62 can control execution of a debug instruction, such as the dnh or dnh2 instruction, in a first manner or a second manner based on a value stored in a corresponding group control field of the appropriate debug control register. In one example, in the first manner, a debug operation is performed while in the second manner, no debug operation is performed.

Therefore, it should now be understood how debug operations corresponding to debug instructions can be suppressed. For example, debug instructions can be treated as NOPs during execution rather than causing a debug operation to be performed. In this manner, debug instructions may be left within segments of code, as needed, within causing software interrupts, thus allowing the code to execute properly. That is, typically once code is finalized, dnh instructions, if left within the code, would always generate debug interrupts. These dnh instructions therefore had to be removed for proper code functionality. However, at least one embodiment described herein allows for the suppression of debug interrupts during code execution by including additional control allowing for debug instructions to either perform debug operations or perform no debug operations (such as by being treated as NOPs or by suppressing execution).

In one embodiment, a method includes providing a debug instruction and providing a debug control register field, where if the debug control register field has a first value, the debug instruction executes a debug operation and where if the debug control register field has a second value, the debug instruction is to be executed as a no-operation (NOP) instruction.

In a further embodiment, if the debug control register field has the second value, the NOP instruction is executed in place of a debug interrupt.

In another further embodiment, if the debug control register field has the first value, execution of the debug instruction causes entry into a debug mode.

In another further embodiment, if the debug control register field has the first value, execution of the debug instruction causes a processor to halt.

In another further embodiment, a debugger external to an integrated circuit has write access to the debug control register field and a processor on the integrated circuit does not have write access to the debug control register field.

In another further embodiment, a debugger external to an integrated circuit does not have write access to the debug control register field and a processor on the integrated circuit does have write access to the debug control register field.

In another further embodiment, a debugger external to a processor on an integrated circuit has write access to the debug control register field and the processor on the integrated circuit does not have write access to the debug control register field.

In another further embodiment, the debug instruction includes a group field to indicate one of a plurality of debug instruction groups. In yet a further embodiment, the debug control register field includes a plurality of debug control register field portions, where each debug control register field portion corresponds to one of the plurality of debug instruction groups.

In another embodiment, a method includes providing a first debug instruction, providing a field in the first debug instruction to indicate a group number, and providing a plurality of debug control register fields, where the group number associates a first one of the plurality of debug control register fields to the first debug instruction, where if the first one of the plurality of debug control register fields has a first value, the first debug instruction is to be executed as the first debug instruction, and where if the first one of the plurality of debug control register fields has a second value, the first debug instruction is to be executed as a no-operation (NOP) instruction. The method further includes providing a second debug instruction, where the second debug instruction has no field to indicate the group number, where a second one of the plurality of debug control register fields is associated to the second debug instruction, where if the second one of the plurality of debug control register fields has the first value, the second debug instruction is to be executed as the second debug instruction, and where if the second one of the plurality of debug control register fields has the second value, the second debug instruction is to be executed as the NOP operation instruction.

In a further embodiment of the another embodiment, the first debug instruction is different than the second debug instruction.

In another further embodiment of the another embodiment, the first one of the plurality of debug control register fields and the second one of the plurality of debug control register fields are a same one of the plurality of debug control register fields.

In another further embodiment of the another embodiment, the first one of the plurality of debug control register fields and the second one of the plurality of debug control register fields are different ones of the plurality of debug control register fields.

In another further embodiment of the another embodiment, if the first one of the plurality of debug control register fields has the first value, execution of the first debug instruction causes entry into a debug mode, and if the second one of the plurality of debug control register fields has the first value, execution of the second debug instruction causes entry into the debug mode.

In another further embodiment of the another embodiment, wherein if the first one of the plurality of debug control register fields has the first value, execution of the first debug instruction causes a processor to halt, and if the second one of the plurality of debug control register fields has the first value, execution of the second debug instruction causes the processor to halt.

A data processing system, in accordance with one embodiment, includes instruction fetch circuitry for receiving a debug instruction, a debug control register field, and debug execution control circuitry, coupled to the instruction fetch circuitry and to the debug control register field. The debug execution control circuitry controls execution of the debug instruction in a first manner if the debug control register field has a first value, and the debug execution control circuitry controls execution of the debug instruction in a second manner if the debug control register field has a second value, where in the first manner a debug operation is performed, and where in the second manner no debug operation is performed.

In a further embodiment of the data processing system, if the debug control register field has the first value, execution of the debug instruction causes entry into a debug mode.

In another further embodiment of the data processing system, if the debug control register field has the first value, execution of the debug instruction causes debug interrupt processing to be initiated.

In another further embodiment of the data processing system, if the debug control register field has the first value, execution of the debug instruction causes the instruction fetch circuitry to halt normal instruction fetches.

In another further embodiment of the data processing system, the debug instruction includes a group field to indicate one of a plurality of debug instruction groups, and where the one of the plurality of debug instruction groups selects the debug control register field from among a plurality of debug control register fields.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIGS. 1 and 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 18 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method, comprising:
   providing a first debug instruction;
   providing a field in the first debug instruction to indicate a group number;
   providing a plurality of debug control register fields,
   wherein the group number associates a first one of the plurality of debug control register fields to the first debug instruction,
   wherein if the first one of the plurality of debug control register fields has a first value, the first debug instruction is to be executed as the first debug instruction, and
   wherein if the first one of the plurality of debug control register fields has a second value, the first debug instruction is to be executed as a no-operation (NOP) instruction; and
   providing a second debug instruction, wherein the second debug instruction has no field to indicate the group number,
   wherein a second one of the plurality of debug control register fields is associated to the second debug instruction,
   wherein if the second one of the plurality of debug control register fields has the first value, the second debug instruction is to be executed as the second debug instruction, and
   wherein if the second one of the plurality of debug control register fields has the second value, the second debug instruction is to be executed as the NOP operation instruction.

2. A method as in claim 1, wherein a debugger external to an integrated circuit has write access to the debug control register fields and a processor on the integrated circuit does not have write access to the debug control register fields.

3. A method as in claim 1, wherein a debugger external to an integrated circuit does not have write access to the debug control register fields and a processor on the integrated circuit does have write access to the debug control register fields.

4. A method as in claim 1, wherein a debugger external to a processor on an integrated circuit has write access to the debug control register fields and the processor on the integrated circuit does not have write access to the debug control register fields.

5. A method as in claim 1, wherein the first debug instruction is different than the second debug instruction.

6. A method as in claim 1, wherein the first one of the plurality of debug control register fields and the second one of the plurality of debug control register fields are a same one of the plurality of debug control register fields.

7. A method as in claim 1, wherein the first one of the plurality of debug control register fields and the second one of the plurality of debug control register fields are different ones of the plurality of debug control register fields.

8. A method as in claim 1, wherein if the first one of the plurality of debug control register fields has the first value, execution of the first debug instruction causes entry into a debug mode, and wherein if the second one of the plurality of debug control register fields has the first value, execution of the second debug instruction causes entry into the debug mode.

9. A method as in claim 1, wherein if the first one of the plurality of debug control register fields has the first value, execution of the first debug instruction causes a processor to halt, and wherein if the second one of the plurality of debug control register fields has the first value, execution of the second debug instruction causes the processor to halt.

10. A data processing system, comprising:
  instruction fetch circuitry for receiving debug instructions, the debug instructions comprising a first debug instruction and a second debug instruction, the second debug instruction comprising a field to indicate a group number;
  a plurality of debug control register fields, wherein a first one of the plurality of debug control register fields is associated with the first debug instruction and wherein the group number associates a second one of the plurality of debug control register fields to the second debug instruction; and
  debug execution control circuitry, coupled to the instruction fetch circuitry and to the debug control register field, the debug execution control circuitry controlling execution of the first debug instruction in a first manner if the first one of the debug control register fields has a first value, and the debug execution control circuitry controlling execution of the first debug instruction in a second manner if the first one of the debug control register fields has a second value, wherein in the first manner a debug operation is performed, and wherein in the second manner no debug operation is performed, and the debug execution control circuitry controlling execution of the second debug instruction in a third manner if the second one of the debug control register fields has a third value and in a fourth manner if the second one of the debug control register fields has a fourth value, wherein in the third manner a debug operation is performed, and wherein in the fourth manner no debug operation is performed.

11. A data processing system as in claim 10, wherein if the first one of the debug control register fields has the first value, execution of the debug instruction causes entry into a debug mode.

12. A data processing system as in claim 10, wherein if the first one of the debug control register fields has the first value, execution of the debug instruction causes debug interrupt processing to be initiated.

13. A data processing system as in claim 10, wherein if the first one of the debug control register fields has the first value, execution of the debug instruction causes the instruction fetch circuitry to halt normal instruction fetches.

14. A data processing system as in claim 10, wherein the first debug instruction comprises a group field to indicate one of the plurality of debug instruction groups, and wherein the one of the plurality of debug instruction groups selects the first one of the debug control register fields from among the plurality of debug control register fields.

* * * * *